United States Patent [19]

Tanaka et al.

[11] Patent Number: 4,722,231
[45] Date of Patent: Feb. 2, 1988

[54] ELECTROMAGNETIC FLOWMETER

[75] Inventors: Yoshiro Tanaka, Isehara; Sakae Ishikawa, Yokohama; Norikazu Wada, Ayase; Tsutomu Goto, Tokyo; Tokuji Yoshino, Kawasaki, all of Japan

[73] Assignee: Yamatake-Honeywell Co., Ltd., Tokyo, Japan

[21] Appl. No.: 862,739

[22] Filed: May 13, 1986

[30] Foreign Application Priority Data

May 14, 1985 [JP] Japan ............................... 60-100471
May 14, 1985 [JP] Japan ............................... 60-100472
May 21, 1985 [JP] Japan ............................... 60-106871

[51] Int. Cl.⁴ .............................................. G01F 1/58
[52] U.S. Cl. .................................................. 73/861.12
[58] Field of Search ........................ 73/861.11–861.17

[56] References Cited

U.S. PATENT DOCUMENTS

| | | | |
|---|---|---|---|
| 3,334,518 | 8/1967 | Miyamichi | 73/861.12 |
| 3,610,040 | 10/1971 | Wada | 73/861.12 |
| 4,507,975 | 4/1985 | Bittner et al. | 73/861.12 |
| 4,607,533 | 8/1986 | Kuroda et al. | 73/861.12 |

FOREIGN PATENT DOCUMENTS 59-28219  2/1984  Japan .
WO84/03764  9/1984  PCT Int'l Appl. .............. 73/861.12

OTHER PUBLICATIONS

Published Japanese Translations of PCT Pat. No. Sho 58-501552, 9-16-83.

*Primary Examiner*—Charles A. Ruehl
*Attorney, Agent, or Firm*—Townsend & Townsend

[57] ABSTRACT

An electromagnetic flowmeter includes a metal case and a ceramic measuring pipe with a pair of coils and a pair of electrodes. The ceramic measuring pipe is a straight pipe or a pipe with flanges. The ceramic measuring pipe is detachably mounted in the metal case directly or through metal rings. O-rings are fluid-tightly mounted in flanges of the ceramic measuring pipe or the metal rings, respectively. A ground rod extends through a hole in the wall of the measuring pipe. One end of the ground rod is in contact with the conductive fluid and the other end thereof is electrically connected to the case through a screw or banana jack.

17 Claims, 18 Drawing Figures

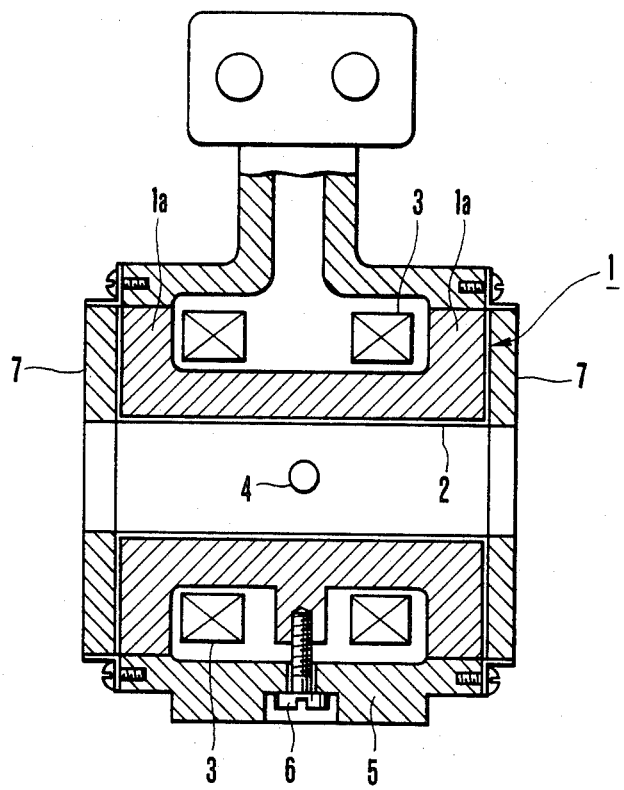
FIG. 1
PRIOR ART
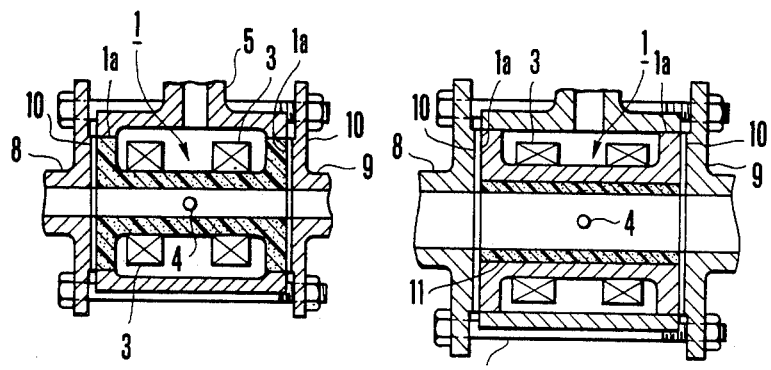
FIG. 2
PRIOR ART
FIG. 3
PRIOR ART

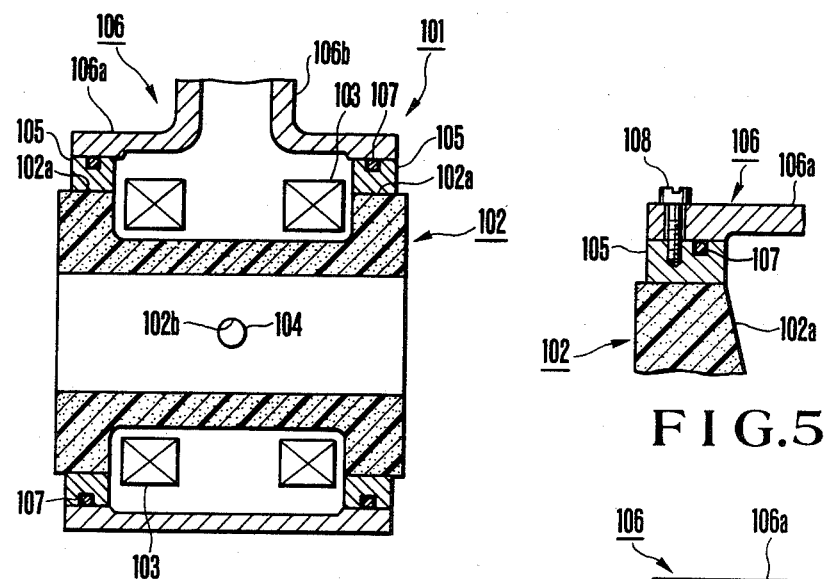
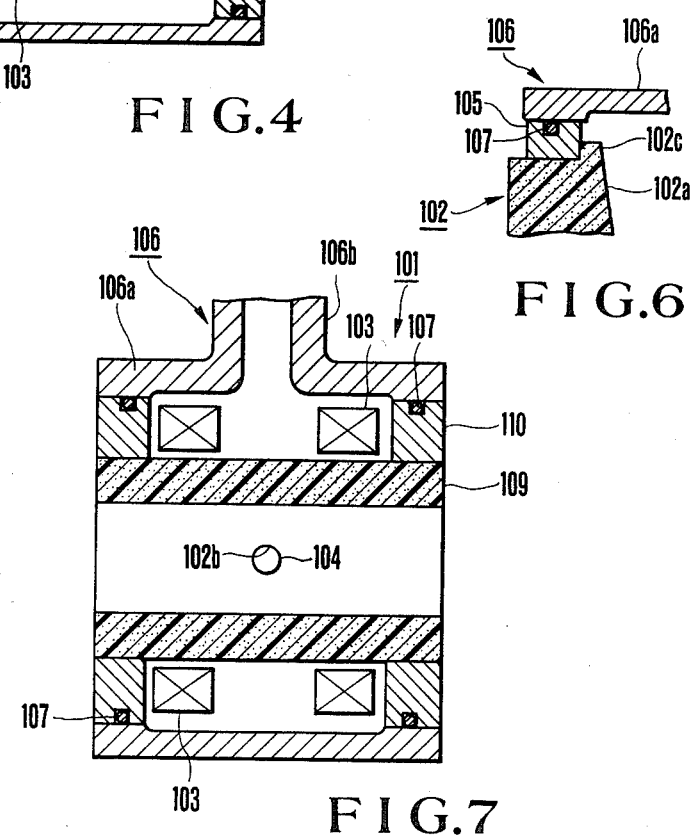
FIG.4
FIG.5
FIG.6
FIG.7

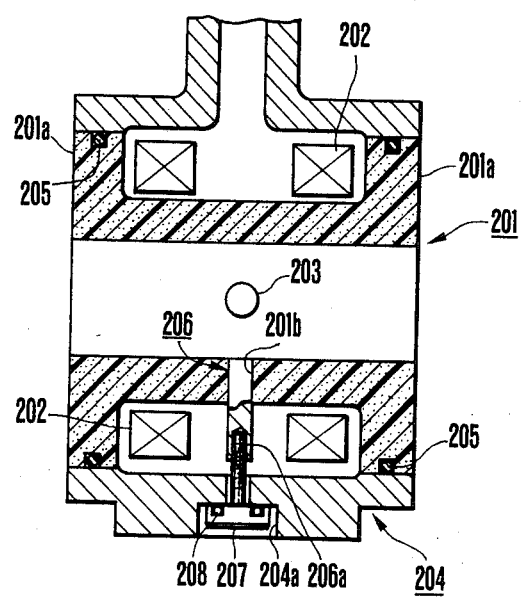
FIG.8
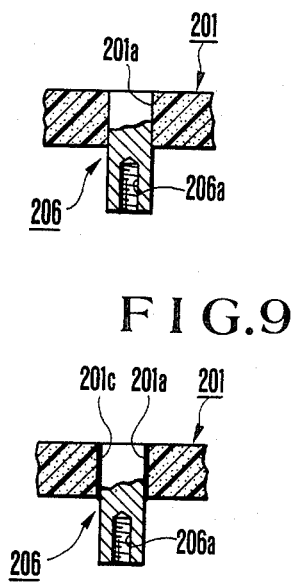
FIG.9
FIG.10
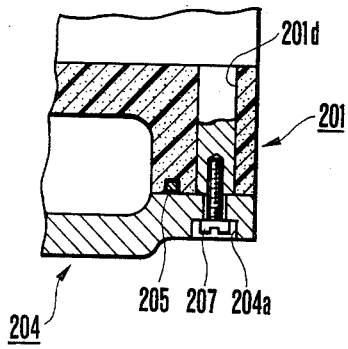
FIG.11
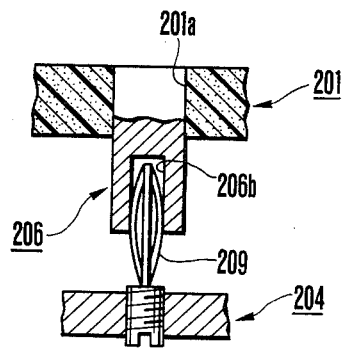
FIG.12

ELECTROMAGNETIC FLOWMETER

BACKGROUND OF THE INVENTION

The present invention relates to an electromagnetic flowmeter with a ceramic measuring pipe.

An electromagnetic flowmeter converts a flow rate of a conductive fluid flowing in a measuring pipe to an electrical signal by utilizing Faraday electromagnetic induction and measures the flow rate on the basis of the electrical signal. The electromagnetic flowmeter has many advantages in that no movable parts are used for measurement, no pressure loss occurs upon measurement, and a flow rate of a corrosive fluid or a fluid containing a slurry, which cannot be easily measured by other measuring instruments, can be measured. Electromagnetic flowmeters have been used in a variety of applications due to the above advantages.

A typical example of a measuring pipe used in a conventional electromagnetic flowmeter of this type is a metal pipe with a synthetic resin lining as shown in FIG. 1. Referring to FIG. 1, a metal measuring pipe 1 has flanges 1a to be coupled to pipes through which a fluid to be measured flows. The inner surface of the measuring pipe 1 and contact surfaces of the flanges 1a are covered with Teflon (PTFE) linings 2. A pair of excitation coils 3 of a U-shaped circumferential section are screwed on the outer surface of the measuring pipe 1. A pair of electrodes 4 are inserted in holes formed in the opposite wall surface portions of the pipe 1 which are rotated through 90° from the circumferential centers of the coils 3. The electrodes 4 extend into the interior of the measuring pipe 1 and are in contact with the conductive fluid flowing therethrough. A meter case 5 is fixed on the flanges 1a of the measuring pipe 1 by screws 6. Ground rings 7 are screwed to the case 5 at the contact surfaces of the flanges 1a and are in contact with pipes through which the conductive fluid flows.

With this arrangement, when the conductive fluid flows through the measuring pipe 1, upon energization of the excitation coils 3, an electromotive force proportional to an average flow rate is generated across the electrodes 4 which are arranged perpendicularly to the direction of the magnetic field and the flow direction of conductive fluid, respectively. The electromotive force is measured to determine the corresponding flow rate of the conductive fluid. In this case, the inner surfaces of the ground rings 7 insulated by the linings 2 from the measuring pipe 1 are in contact with the fluid, the outer surfaces of the ground rings 7 are short-circuited to the case 5, and the conductive fluid is connected to the reference potential. Therefore, the electromotive force can be accurately extracted by the electrodes 4.

The conventional electromagnetic flowmeter can be properly operated when the measuring pipe 1 is a metal pipe, as described above. However, if the measuring pipe 1 is a ceramic pipe which is recently popular in favor of various advantages, holes for the screws 6 cannot be properly formed in the pipe and the manufacturing cost is increased. In addition, high mechanical strength cannot be expected.

In other conventional electromagnetic flowmeters with a ceramic measuring pipe each, the ceramic measuring pipe is fixed to a metal case by shrink fit. Japanese patent publication No. 58-501552 describes a typical example of a conventional electromagnetic flowmeter of this type, as shown in FIG. 2. Pipes 8 and 9 are coupled to flanges 1a at both open ends of a ceramic measuring pipe 1 through gaskets 10. A pair of excitation coils 3 are fixed on the outer surface of the measuring pipe 1. A metal case 5 is fixed to the flanges 1a of the measuring pipe 1 by shrink fit. A pair of electrodes 4 are fitted in holes formed in the wall of the measuring pipe 1 and are located at positions such that axes thereof are perpendicular to the direction of the magnetic field of the excitation coils 3 and to the flow direction of the conductive fluid. The operation of this flowmeter is the same as that in FIG. 1.

In the flowmeter shown in FIG. 2, after the excitation coils 3 and the electrodes 4 are mounted in position, the metal case 5 must be fixed to the measuring pipe 1 by shrink fit. Heat of shrink-fit is inevitably conducted to the excitation coils 3 and the like. Then, heat-resistant materials must be used for the coils 3 and the like. In addition, once the metal case 5 is shrink-fitted on the measuring pipe 1, the measuring pipe 1 cannot be replaced with a new one. As a result, the flowmeter itself must be replaced with a new one if a need for replacement of the pipe 1 arises.

Japanese Utility Model Prepublication No. 59-28219 describes another typical example of a conventional electromagnetic flowmeter with a ceramic measuring pipe, as shown in FIG. 3. A straight ceramic pipe 11 is shrink-fitted in the metal measuring pipe 1 with flanges 1a at both ends thereof. Pipes 8 and 9 are coupled to the measuring pipe 1 through gaskets 10. Excitation coils 3 and electrodes 4 are arranged in the measuring pipe 1 in the same manner as in FIG. 2. The metal case 5 is shrink-fitted on the flanges 1a of the measuring pipe 1. The operation of this flowmeter is the same as that in FIG. 1.

In the flowmeter shown in FIG. 3, the gaskets 10 as the seal surfaces are in contact with end faces of the metal flanges 1a when the pipes 8 and 9 are coupled to the measuring pipe 1. Therefore, even if the ceramic pipe 11 is fitted in the measuring pipe 1, the resistance to corrosion cannot be improved.

SUMMARY OF THE INVENTION

It is, therefore, a principal object of the present invention to provide an electromagnetic flowmeter, wherein a heat-resistant material need not be used and a range of materials which can be used is widened.

It is another object of the present invention to provide an electromagnetic flowmeter, wherein workability can be improved, the manufacturing cost can be decreased, and ceramic properties can be properly utilized.

It is still another object of the present invention to provide an electromagnetic flowmeter, wherein a ceramic measuring pipe can be easily replaced and maintained to decrease measurement cost.

It is still another object of the present invention to provide an electromagnetic flowmeter, wherein the resistance to corrosion can be improved.

It is still another object of the present invention to provide an electromagnetic flowmeter, wherein measuring precision can be improved.

It is still another object of the present invention to provide an electromagnetic flowmeter, wherein the mechanical strength of the flowmeter as a whole can be improved.

It is still another object of the present invention to provide a lightweight, compact electromagnetic flowmeter.

It is still another object of the present invention to provide an electromagnetic flowmeter wherein magnetic leakage can be prevented.

According to an aspect of the present invention, there is provided an electromagnetic flowmeter, wherein metal rings are shrink-fitted on open end portions of a ceramic measuring pipe and a metal case can be detachably mounted on the metal rings through corresponding O-rings.

According to another aspect of the present invention, there is provided an electromagnetic flowmeter, wherein a ground rod is fluid-tightly embedded in the wall of a ceramic measuring pipe, one end of the ground rod is exposed in the fluid flow path, and the other end is externally grounded to the case.

According to still another aspect of the present invention, there is provided an electromagnetic flowmeter, wherein at least one of a metal case and electrical components is fixed to metal rings through support member or members.

According to still another aspect of the present invention, there is provided an electromagnetic flowmeter, wherein the support members are made of annular magnetic plates to cover substantially the entire inner surfaces of metal rings shrink-fitted on the flanges.

BRIEF DESCRIPTION OF THE DRAWINGS

FIG. 1 is a longitudinal sectional view showing a conventional electromagnetic flowmeter;

FIGS. 2 and 3 are respectively longitudinal sectional views showing other conventional electromagnetic flowmeters;

FIG. 4 is a longitudinal sectional view showing an electromagnetic flowmeter according to an embodiment of the present invention;

FIGS. 5 and 6 are sectional views showing modifications of a metal ring portion in FIG. 4;

FIG. 7 is a longitudinal sectional view showing an electromagnetic flowmeter according to another embodiment of the present invention;

FIG. 8 is a longitudinal sectional view showing an electromagnetic flowmeter according to still another embodiment of the present invention;

FIG. 9 is a sectional view of a ground rod portion in FIG. 8;

FIGS. 10 to 12 are respectively sectional views showing modifications of the ground rod portion in FIG. 9.

DESCRIPTION OF THE PREFERRED EMBODIMENTS

Figure 13:
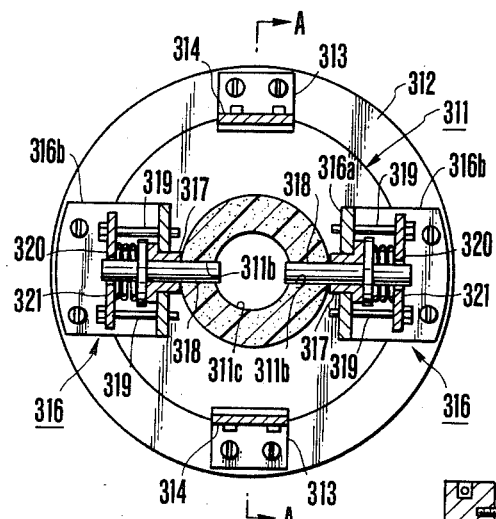
FIG. 13 is a cross-sectional view showing a modification of the electromagnetic flowmeter according to the present invention.

FIG. 4 shows an electromagnetic flowmeter according to an embodiment of the present invention. Referring to FIG. 4, an electromagnetic flowmeter 101 includes a measuring pipe 102 with flanges 102a at both open ends thereof. A pair of excitation coils 103 of a U-shaped circumferential section are fixed on the outer surface of the measuring pipe 102. A pair of electrodes 104 are fluid-tightly inserted in a pair of electrode holes 102b formed in the wall of the measuring pipe 102. The axes of the electrodes 104 are perpendicular to the direction of the magnetic field of the excitation coils 103 and to the flow direction of a conductive fluid flowing in the measuring pipe 102. The distal ends of the electrodes 104 are in contact with the conductive fluid. Metal rings 105 are fixed on the circumferential surfaces of the flanges 102a by shrink fit. A metal case 106 integrally consists of a cylindrical portion 106a and a converter support portion 106b. The metal case 106 can be detachably mounted on the measuring pipe 102 by fitting the inner surface of the cylindrical portion 106a with the outer surfaces of the flanges 102a. O-rings 107 are fitted in annular grooves of the flanges 102a and contact with the inner surface of the cylindrical portion 106a. Pipes (not shown) are coupled to the open end faces of the measuring pipe 102 through seal gaskets (not shown). A converter and a terminal block are supported in the converter support portion 106b.

With the above arrangement, when the conductive fluid flows through the measuring pipe 102, upon energization of the excitation coils 103, an electromotive force proportional to an average speed of the fluid is generated across the electrodes 104 in a direction perpendicular to the direction of the magnetic field and to the direction of fluid flow. The electromotive force is converted by the converter to a signal representing a flow rate of the conductive fluid, thereby measuring the flow rate.

In the electromagnetic flowmeter described above, the metal rings shrink-fitted on the ceramic measuring pipe are mounted in the case. Even if the excitation coils and the like are mounted on the inner assembly, they are not heated at the time of assembly. Therefore, a heat-resistant material need not be selected. The case 106 can be moved in the axial direction thereof and can be easily removed for replacing or maintaining the measuring pipe.

The metal rings 105 can be easily worked, unlike with a ceramic material. In the metal ring portion shown in FIG. 5, a screw hole may be formed in each metal ring 105 and may be threadably engaged with a screw 108. The case 106 can be detachably and firmly fixed to the metal rings 105.

As shown in FIG. 6, each flange 102a of the pipe 102 may have a step 102c to properly position the corresponding metal ring 105 and to allow easy and reliable shrink-fitting of the metal ring 105.

FIG. 7 shows an electromagnetic flowmeter according to another embodiment of the present invention. The same reference numerals in FIG. 7 denote the same parts as in FIG. 4, and a detailed description thereof will be omitted. Referring to FIG. 7, a ceramic measuring pipe 109 is a straight pipe without flanges. Metal rings 110 having a larger diameter than that shown in FIG. 4 are shrink-fitted on the end portions of the measuring pipe 109. Other arrangements in FIG. 7 are the same as those in FIG. 4. The same effect as in FIG. 4 can be obtained in FIG. 7.

According to the above embodiments described above, the end portions of the ceramic measuring pipe are shrink-fitted in the metal rings. The metal case can be detachably mounted on the metal rings through the O-rings. The excitation coils and the electrodes can be mounted in the measuring pipe at room temperature after the metal rings are shrink-fitted on the measuring pipe. Therefore, the excitation coils are not heated and a heat-resistant material need not be particularly selected for coils, electrode, and the like.

Since the metal case is engaged with the metal rings, the grooves for O-rings can be easily formed in the metal rings, unlike in the ceramic rings. The manufacturing cost can therefore be reduced, and the ceramic properties can be effectively utilized.

The case can be easily removed from the measuring pipe since the case is not shrink-fitted on the pipe. The measuring pipe can be easily replaced or maintained. Compared to the conventional case wherein the entire flowmeter must be replaced with a new one, the various expenses can be reduced.

Since the seal gaskets for piping are brought into contact with the ceramic pipe, the resistance to corrosion can be improved and the ceramic properties can be effectively utilized.

FIGS. 8 and 9 show an electromagnetic flowmeter according to still another embodiment of the present invention. Referring to FIGS. 8 and 9, a measuring pipe 201 to be coupled to pipes through which a conductive fluid of interest flows has flanges 201a. The measuring pipe 201 is made of a ceramic such as Al$_2$O$_3$. A pair of excitation coils 202 of a substantially U-shaped circumferential section are screwed on the outer surface of the measuring pipe 201. A pair of electrodes 203 are fluid-tightly inserted in a pair of electrode holes formed in the wall of the measuring pipe 201. The axes of the electrodes 203 are perpendicular to the direction of the magnetic field of the excitation coils 202 and to the flow direction of a conductive fluid flowing in the measuring pipe 201. The distal ends of the electrodes 203 are in contact with the conductive fluid. The flanges 201aof the measuring pipe 201 are in contact with the inner surface of a metal case 204. O-rings 205 as seal members are inserted between the case 204 and the flanges 201a. A radial ground rod hole 201b is formed in the wall of the measuring pipe 201 at substantially the center along the axial and circumferential directions of the excitation coil 202. The measuring pipe 201 is prepared by sintering a pipe body with the ground rod hole 201b. The distal end of a metal ground rod 206 is cooled and fitted in the hole 201b and is in contact with the fluid in the flow path. Cooling and fitting of the ground rod 206 is performed such that the ground rod 206 is cooled and inserted in the hole 201b and is then heated to room temperature. As a result, the ground rod 206 can be fluid-tightly fitted in the hole 201b. A screw hole 206a is formed in the end portion of the ground rod 206 at the side away from the flow path. A stepped hole 204a is formed in the wall of the case 204 and is aligned with the screw hole 206a. A screw 207 is inserted in the hole 204a and threadably engaged with the screw hole 206a to electrically couple the ground rod 206 to the case 204. An O-ring 208 is inserted between the screw 207 and the case 204.

With this arrangement, when the conductive fluid flows through the measuring pipe 201 connected to piping, upon energization of the excitation coils 202, an electromotive force proportional to the average flow rate of the fluid is generated across the electrodes 203 which are arranged perpendicularly to the direction of magnetic field of the excitation coils 202 and to the flow direction of fluid. The electromotive force is converted to an electrical signal to detect the flow rate. In the arrangement described above, one end of the ground rod 206 is in fluid-tight contact with the fluid and the other end is electrically connected to the case 204 through the screw 207. The ground rod 206 serves as a conventional ground ring. The fluid to be measured can have the same potential as that of the flowmeter. In addition, the screw 207 firmly fixes the measuring pipe 201 and the case 204.

In the above embodiment, the ground rod 206 is cooled and fitted in the hole so as to fluid-tightly fix the ground rod 206 in the measuring pipe. However, as shown in FIG. 10 representing the same portion as that in FIG. 9, after the measuring pipe 201 with the hole 201b is sintered, a metal film 201c may be formed on the wall surface defining the hole 201b and may be brazed to the ground rod 206. Alternatively, the ground rod 206 may be inserted in the hole 201b at the time of sintering, thereby constituting an integral body.

FIG. 11 shows another modification of the embodiment shown in FIGS. 8 and 9. A ground rod hole 201d is formed in the flange 201aof the measuring pipe 201 to electrically connect the metal case 204 to the ground rod 206 through the screw 207. The same effect as in the embodiment of FIG. 8 is obtained in the modification of FIG. 11. In addition, an O-ring is not required for the screw 207.

As shown in FIG. 12, a banana jack 209 may be used in place of the screw 207 to prevent the ground rod 206 from removal. The banana jack 209 acts an expansion force on the hole 206b of the ground rod 206 from the case 204 side.

According to the embodiment of FIG. 8 and its modifications, the ground rod is fluid-tightly embedded extending through the wall of the ceramic measuring pipe. One end of the ground rod is in contact with the fluid, and the other end is electrically connected to the case through a fixing means. The ground rod serves as the conventional ground ring to set the fluid and the flowmeter at the identical potential to improve measurement precision. At the same time, the ground ring, its wiring and ceramic machining can be omitted to reduce the manufacturing cost. The ground rod also serves to fix the case and the measuring case, thereby improving the rigidity of the flowmeter as a whole.

In the above embodiments, the excitation coils and the like are mounted on the ceramic measuring pipe. However, the present invention is not limited to this structure.

Figure 14:
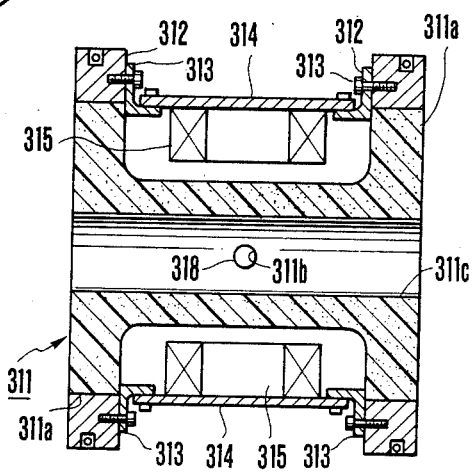
FIG. 14 is a longitudinal sectional view showing a state wherein excitation coils are mounted on support plates in the modification of FIG. 13.

For example, as shown in FIGS. 13 and 14, L-shaped brackets 313 as support members are screwed at opposite positions of each of the inner surfaces of flanges 311a of a measuring pipe 311. Rectangular support plates 314 are respectively bridged between the corresponding pairs of brackets 313 and screwed at ends thereof. Excitation coils 315 of a substantially U-shaped section as electrical components are fixed at two end portions of the support plates 314 so as to surround the measuring pipe 311. Support plates 316 are substantially U-shaped support plates each consisting of a strip-like plate 316a and mounting plates 316b continuous to the plate 316a. The mounting plates 316b are fixed to the inner surfaces of metal rings 312. The centers of the mounting plates 316b are rotated through 90° about the centers of the excitation coils 315. Electrodes 318 inserted in holes 311b of the measuring pipe 311 are respectively supported by insulating bushes 317 mounted in the support plates 316 along the longitudinal direction. The inner ends of the electrodes 318 are brought into contact with the conductive fluid passing in an inner hole 311c of the measuring pipe 311. The outer ends of the electrodes 318 are inserted in holes of insulating plates 320 supported by bolts 319 on the support plates 316. Compression springs 321 are inserted between the insulating plates 320 and the collars of the electrodes 318. The central lines of the electrodes 318 are perpendicular to the direction of magnetic field of the excitation coils 315 and to the flow direction of the conductive fluid. The seal between the electrodes 318 and the electrode holes 311b is performed by fit with cooling, adhesive members or O-rings.

Figure 15:
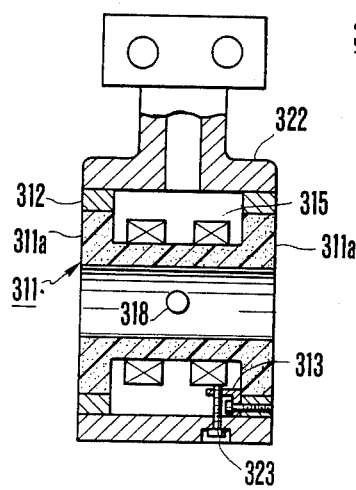
FIGS. 15 and 16 are respectively longitudinal sectional views showing still other modifications of the present invention.
Figure 16:
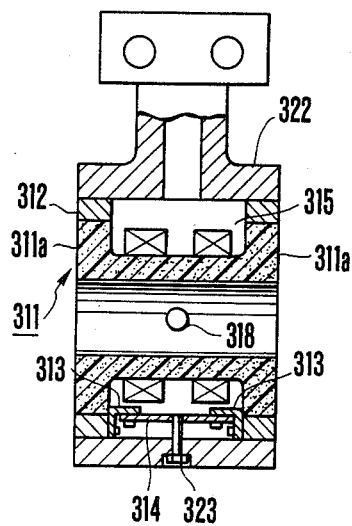

In the modification of FIGS. 13 and 14, the excitation coils 315 as the electrical components are fixed to the brackets 313 through the support plates 314. However, the brackets 313 can fix the case, as shown in FIGS. 15 and 16. In the modification of FIG. 15, a bracket 313 is screwed on the inner surface of one of the metal rings 312 shrink-fitted on the flanges 311a of the ceramic measuring pipe 311. A metal case 322 fitted on the measuring pipe 311 is fixed to the bracket 313 by a bolt 323. In the modification of FIG. 16, a support plate 314 is bridged between brackets 313 fixed on the inner surfaces of the metal rings 312. The case 322 fitted on the measuring pipe 311 is fixed to the support plate 314 by a bolt 323.

In each of the modifications in FIGS. 13 to 16, the metal rings are shrink-fitted on the measuring pipe, and one of the case and the internal electrical components (e.g., excitation coils) is mounted on the rings through the bracket or brackets 313. However, both the electrical components and the case can be fixed to the metal rings 312.

The operations of these modifications are the same as those of the previous embodiments.

Figure 17:
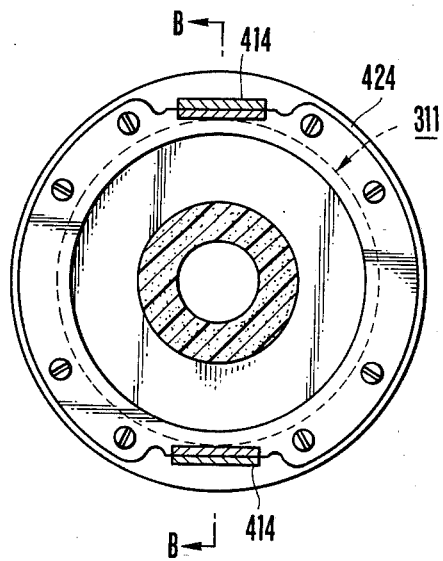
FIG. 17 is a cross-sectional view showing still another modification of the electromagnetic flowmeter according to the present invention.
Figure 18:
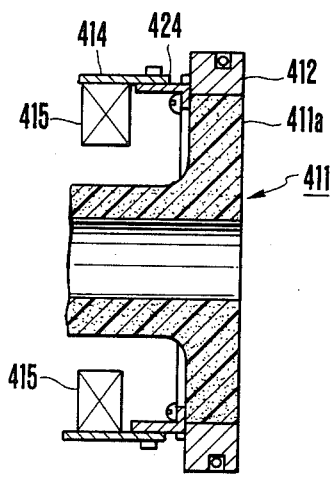
FIG. 18 is a sectional view of the modification in FIG. 17 when taken along the line B—B thereof.

FIGS. 17 and 18 show still another modification of the electromagnetic flowmeter according to the present invention. Metal rings 412 are respectively shrink-fitted on flanges 411a of a ceramic measuring pipe 411, and annular brackets 424 as support members are respectively screwed on the inner surfaces of the rings 412. The annular brackets 424 are made of a magnetic material and cover substantially the entire inner surfaces of the metal rings 412. Excitation coils 415 are fixed on support plates 414 bridged between the brackets 424. Other arrangements of this modification are the same as those in FIGS. 13 and 14.

Since the substantially entire inner surfaces of the metal rings 412 are respectively covered by the brackets 424, the outer sides of the excitation coils 415 are covered by the magnetic brackets 424 and the ceramic flanges 411a, thereby preventing magnetic leakage.

In the modifications described above, the metal rings 312 (412) are respectively shrink-fitted on the flanges 311a(411a) of the measuring pipe 311 (411). However, they may be fixed by an adhesive or brazing after depositing a metal on ceramic surfaces. The brackets 313 (424) may be fixed to the rings 312 (412) by welding. The positions of the brackets 313 are not limited to the illustrated positions.

At least one of the case and the internal electrical components is fixed to the metal rings through the support member or members. Complex working need not be performed for the ceramic material mounted with the electrical components and the case, and the manufacturing cost can be reduced. Compared to the conventional electromagnetic flowmeter having a flanged metal pipe which covers the ceramic inner pipe and which is mounted with the electrical components and the case, the flowmeters of the present invention can be compact and lightweight and have the same mechanical strength as in the conventional flowmeter having the metal pipe. The support members fixed to the metal rings are made of the annular brackets to cover substantially the entire inner surfaces of the metal rings, thereby preventing magnetic leakage.

What is claimed is:

1. An electromagnetic flowmeter including a metal case, said metal case consisting of a cylindrical portion and a converter support, a pair of excitation coils for generating a predetermined magnetic field, and a pair of electrodes cooperating with said pair of excitation coils to generate an electromotive force proportional to a flow rate of a conductive fluid, including:

a ceramic measuring pipe detachably mounted in said metal case, said pair of excitation coils being mounted on an outer surface of said cermaic measuring pipe, and said pair of electrode being inserted in holes formed in a wall of said ceramic measuring pipe and being adapted to extend along a direction perpendicular to a direction of the magnetic field from said pair of excitation coils and a direction of flow of the conductive fluid;

a pair of metal rings each mounted around a different end portion of said ceramic measuring pipe by shrink fit, each ring having a groove in the outer surface thereof; and a pair of O-rings each fitted in the groove of a different one of said pair of metal rings for fluid-tightly supporting said metal case and said ceramic measuring pipe.

2. A flowmeter according to claim 1, wherein said ceramic measuring pipe has flanges at both ends thereof, and said metal rings are shrink-fitted on said flanges, respectively.

3. A flowmeter according to claim 2, wherein said flanges have steps for positioning said metal rings, respectively.

4. A flowmeter according to claim 3, further including screws for fixing said metal rings and said metal case.

5. A flowmeter according to claim 2, further including support members, fixed to said metal rings, for supporting one of said metal case and said excitation coils.

6. A flowmeter according to claim 5, wherein said support members comprise L-shaped brackets each of which is fixed to a corresponding one of said metal rings to support said one of said metal case and said excitation coils.

7. A flowmeter according to claim 6, further including support plates bridged between corresponding pairs of said brackets.

8. A flowmeter according to claim 7, wherein said electrical components comprises said excitation coils.

9. A flowmeter according to claim 5, wherein said support members comprise annular magnetic brackets mounted on substantially entire inner surfaces of said metal rings.

10. A flowmeter according to claim 9, further including support plates, bridged and fixed to opposite positions of said annular magnetic brackets, for supporting said excitation coils.

11. A flowmeter according to claim 2 further including support members, fixed to said metal rings, for supporting said excitation coils, said support members comprising substantially U-shaped members each consisting of a strip-like plate and a pair of mounting plates continuous to said strip-like plate.

12. A flowmeter according to claim 11, further including compression springs for biasing said electrodes and bushes for supporting said electrodes.

13. A flowmeter according to claim 1, further including:

a ground rod fluid-tightly embedded in a hole formed in a wall surface of said ceramic measuring pipe, one end of said ground rod being in contact with the conductive fluid; and fixing means, inserted in a stepped hole in said metal case and fixed to the other end of said ground rod, for electrically connecting said ground rod to said metal case.

14. A flowmeter according to claim 13, wherein said fixing means comprises a banana jack inserted in the other end of said ground rod through said stepped hole in said metal case.

15. A flowmeter according to claim 13, further including an O-ring inserted between said ground rod and said fixing means.

16. A flowmeter according to claim 15, wherein said fixing means comprises a screw threadably engaged with the other end of said ground rod through said stepped hole in said metal case.

17. A flowmeter according to claim 13, further including a metal film formed on a ceramic measuring pipe wall portion defining said hole, said metal film being brazed to said ground rod.

* * * * *